US007013795B2

(12) United States Patent
Mulle et al.

(10) Patent No.: US 7,013,795 B2
(45) Date of Patent: Mar. 21, 2006

(54) GRIND AND BREW COFFEE APPARATUS

(75) Inventors: Theodore B. Mulle, New Milford, CT (US); James Robert Barraclough, Waterbury, CT (US)

(73) Assignee: Conair Corporation, Stamford, CT (US)

( * ) Notice: Subject to any disclaimer, the term of this patent is extended or adjusted under 35 U.S.C. 154(b) by 484 days.

(21) Appl. No.: 10/340,547

(22) Filed: Jan. 10, 2003

(65) Prior Publication Data

US 2003/0167928 A1 Sep. 11, 2003

Related U.S. Application Data

(60) Provisional application No. 60/368,182, filed on Mar. 28, 2002, provisional application No. 60/347,266, filed on Jan. 10, 2002.

(51) Int. Cl.
*A47J 31/42* (2006.01)

(52) U.S. Cl. ............................. 99/286; 99/290; 99/280; 99/289 R (58) Field of Classification Search ................. 99/286, 99/287, 279, 306, 307, 290, 280, 289 R
See application file for complete search history.

(56) References Cited

U.S. PATENT DOCUMENTS

| | | | | |
|---|---|---|---|---|
| 2,470,323 | A | * | 5/1949 | Smith .......................... 99/292 |
| D173,999 | S | | 2/1955 | Reynolds ...................... D26/5 |
| D212,317 | S | | 9/1968 | Hausman ...................... D94/3 |
| D229,158 | S | | 11/1973 | Marotta .......................... D7/2 |
| D244,824 | S | | 6/1977 | Bluestein ...................... D7/85 |
| 4,138,936 | A | | 2/1979 | Williams ...................... 99/282 |
| 4,172,413 | A | | 10/1979 | Roseberry .................... 99/282 |
| 4,303,525 | A | | 12/1981 | Stover ........................ 210/455 |
| 4,406,217 | A | | 9/1983 | Oota ............................ 99/280 |
| 4,412,481 | A | | 11/1983 | Oota et al. ..................... 99/280 |
| 4,510,853 | A | | 4/1985 | Takagi .......................... 99/286 |
| 4,555,984 | A | | 12/1985 | Yamashita ..................... 99/286 |
| 4,608,916 | A | | 9/1986 | Becker et al. ................. 99/283 |
| 4,624,177 | A | * | 11/1986 | Ito et al. ........................ 99/286 |
| 4,644,571 | A | | 2/1987 | Narita et al. .................. 377/56 |
| 4,667,584 | A | | 5/1987 | Koyama et al. ............... 99/280 |
| 4,671,668 | A | | 6/1987 | Narita et al. .................. 368/10 |
| D291,766 | S | | 9/1987 | Steinkamp et al. .......... D7/309 |
| 4,706,555 | A | * | 11/1987 | Nakamura et al. ............ 99/283 |
| 4,765,896 | A | | 8/1988 | Hartley et al. .............. 210/474 |
| 4,838,152 | A | | 6/1989 | Kubicko et al. .............. 99/280 |
| 4,857,758 | A | | 8/1989 | Rigazio et al. ............. 307/140 |
| 4,872,402 | A | | 10/1989 | Johnson et al. ............... 99/280 |
| 4,889,041 | A | | 12/1989 | Mahlich et al. ............... 99/285 |
| 4,893,552 | A | | 1/1990 | Wunder et al. ............... 99/299 |

(Continued)

FOREIGN PATENT DOCUMENTS

DE 2330078 * 6/1972

(Continued)

*Primary Examiner*—Reginald L. Alexander
(74) *Attorney, Agent, or Firm*—Lawrence Cruz; Steven A. Garner (57) ABSTRACT

A grind and brew coffee making apparatus for providing freshly brewed coffee and having a number of features for easy cleaning, more efficient maintenance and improved safety. The coffee making apparatus has a housing assembly with an upper separable top cover, a grinding assembly with a removable grinding chamber and separable grinding chamber cover, a brewing assembly with a removable brew basket and separable brew basket cover, a control assembly with a safety lock mechanism and a control panel for providing a user with control over the various operations of the coffee making apparatus.

17 Claims, 13 Drawing Sheets

U.S. PATENT DOCUMENTS

| | | | |
|---|---|---|---|
| 4,969,393 A | 11/1990 | Chr. Mahlick et al. | 99/285 |
| 5,001,969 A | 3/1991 | Moore et al. | 99/282 |
| 5,038,675 A | 8/1991 | Georg Hartel | 99/286 |
| 5,044,261 A | 9/1991 | Kawazoe | 99/280 |
| 5,133,247 A | 7/1992 | Pastrick | 99/295 |
| 5,183,998 A | 2/1993 | Hoffman et al. | 219/492 |
| 5,241,898 A | 9/1993 | Newman | 99/280 |
| 5,267,506 A | 12/1993 | Cai | 99/280 |
| 5,325,764 A | 7/1994 | Nakamura et al. | 99/282 |
| D350,667 S | 9/1994 | Saltet | D7/309 |
| 5,463,932 A | 11/1995 | Olson | 99/280 |
| 5,465,650 A | 11/1995 | Friedrich et al. | 99/286 |
| 5,511,465 A * | 4/1996 | Friedrich et al. | 99/286 |
| 5,515,771 A | 5/1996 | Smit | 99/280 |
| 5,542,342 A | 8/1996 | McNeill et al. | 99/280 |
| 5,549,035 A | 8/1996 | Wing-Chung | 99/281 |
| 5,568,763 A | 10/1996 | Kunzler | 99/280 |
| 5,570,628 A * | 11/1996 | Kiener et al. | 99/472 |
| D376,950 S | 12/1996 | Saltet | D7/309 |
| 5,674,422 A | 10/1997 | Marinus | 219/497 |
| 5,718,162 A | 2/1998 | Hoover | 99/280 |
| 5,865,095 A * | 2/1999 | Mulle | 99/293 |
| D408,680 S | 4/1999 | Lin | D7/309 |
| 5,910,205 A | 6/1999 | Patel | 99/315 |
| 5,913,961 A * | 6/1999 | Chmiel et al. | 99/286 |
| 5,957,034 A | 9/1999 | Sham et al. | 99/285 |
| 5,957,036 A | 9/1999 | Warner et al. | 99/299 |
| 5,970,849 A | 10/1999 | Baumann et al. | 99/299 |
| 5,992,299 A | 11/1999 | Fong | 99/286 |
| 6,003,435 A | 12/1999 | Patel | 99/283 |
| D419,821 S | 2/2000 | Powell et al. | D7/309 |
| D432,850 S | 10/2000 | Saltet | D7/309 |
| D442,012 S | 5/2001 | Haring et al. | D7/309 |
| 6,227,101 B1 | 5/2001 | Rabadi et al. | 99/280 |
| 6,227,102 B1 | 5/2001 | Sham et al. | 99/286 |
| 6,244,162 B1 | 6/2001 | Dahmen | 99/315 |
| 6,250,209 B1 | 6/2001 | Pope | 99/323 |
| 6,279,458 B1 | 8/2001 | Sham et al. | 99/281 |
| D449,197 S | 10/2001 | Byler | D7/309 |
| 6,298,770 B1 | 10/2001 | Blankenship et al. | 99/304 |
| D453,656 S | 2/2002 | Byler et al. | D7/309 |
| 6,429,447 B1 * | 8/2002 | Nowak et al. | 250/573 |
| 6,481,340 B1 | 11/2002 | Pope | 99/306 |

FOREIGN PATENT DOCUMENTS

| | | | |
|---|---|---|---|
| JP | 5-184464 | | 2/1990 |
| JP | 5-184466 | | 2/1990 |
| JP | 4-97711 | | 3/1990 |
| JP | 4-97716 | | 3/1990 |
| JP | 04097711 | | 3/1990 |
| JP | 4-97714 | | 4/1990 |
| JP | 4-97715 | | 5/1990 |
| JP | 4-97717 | | 8/1990 |
| JP | 4-97716 | * | 4/1992 |

* cited by examiner

GRIND AND BREW COFFEE APPARATUS

Priority of U.S. Provisional patent application Ser. No. 60/368,182, filed on Mar. 28, 2002 and U.S. Provisional Patent Application Ser. No. 60/347,266, filed on Jan. 10, 2002 are claimed under 35 U.S.C. § 119(e).

BACKGROUND OF THE INVENTION

1. Field of the Invention

The present invention relates to a coffee making apparatus. In particular, the present invention relates to a coffee making apparatus that has the combined capability of both grinding and brewing coffee.

2. Description of the Prior Art

The desirability or need for having freshly brewed coffee at home, at work, at restaurants and/or convenience store service stations, is well established. Accordingly, there have been a number of different coffee machines developed over the years that have been directed to improving or enhancing the different aspects associated with the coffee making process. For example, U.S. Pat. No. 6,339,985 is directed to an apparatus and method for providing freshly brewed coffee with a superior aroma. Also, U.S. Pat. No. 6,228,410 provides for a coffee maker that brews coffee at a desirable concentration or strength and also provides a readout of the freshness of the brew remaining in a pot. Still other examples can be found in U.S. Pat. Nos. 5,463,932; 5,285,705; 5,267,507 and 5,083,502.

None of the foregoing inventions address the need for providing convenient freshly brewed coffee using a grind and brew coffee making apparatus having a combination of features that provide optimally fresh coffee flavor/aroma with either freshly ground coffee or previously processed commercial coffee, easy efficient cleaning, and improved safety in use.

SUMMARY OF THE INVENTION

It is an object of the present invention to provide a coffee making apparatus for providing optimal flavor/aroma with either freshly ground coffee or previously processed commercial coffee.

It is another object of the present invention to provide a coffee making apparatus having an improved housing assembly.

It is still another object of the present invention to provide a coffee making apparatus having an improved removable grinding assembly for convenient/easy cleaning and/or filling.

It is yet another object of the present invention to provide a coffee making apparatus having an improved removable brewing assembly for convenient/easy cleaning and/or filling.

It is yet still another object of the present invention to provide a coffee making apparatus having an improved control assembly for improved safety and greater flexibility in use.

These and other objects and advantages of the present invention are achieved by a coffee making apparatus with a housing assembly having an upper casing with a selectively separable top cover, an outer enclosure and a lower support base. The coffee making apparatus also has a grinding assembly with a motor, a grinding blade, a removable grinding chamber with a separable cover, and a grate for sieving coffee grinds. The coffee making apparatus further has a brewing assembly with a fluid reservoir, a removable fluid filter assembly, and a brew basket assembly. The coffee making apparatus still further has a control assembly with a safety lock mechanism and a control panel.

BRIEF DESCRIPTION OF THE DRAWINGS

Other and further objects, advantages and features of the present invention will be understood by reference to the following specification in conjunction with the accompanying drawings, in which like reference characters denote like elements of structure.

DETAILED DESCRIPTION OF THE INVENTION

Referring to the drawings and, in particular, to FIGS. 1 through 5, there is shown an illustrative embodiment of an improved coffee making apparatus generally represented by reference numeral 10. Coffee making apparatus 10 is capable of either grinding and brewing coffee beans or brewing previously processed coffee grinds. Coffee making apparatus 10 has a housing assembly 20, a grinding assembly 40 for selectively grinding coffee beans, a brewing assembly 60 for selectively brewing coffee grinds, and a control assembly 110 for controlling various operations of the coffee making apparatus.

Figure 1:
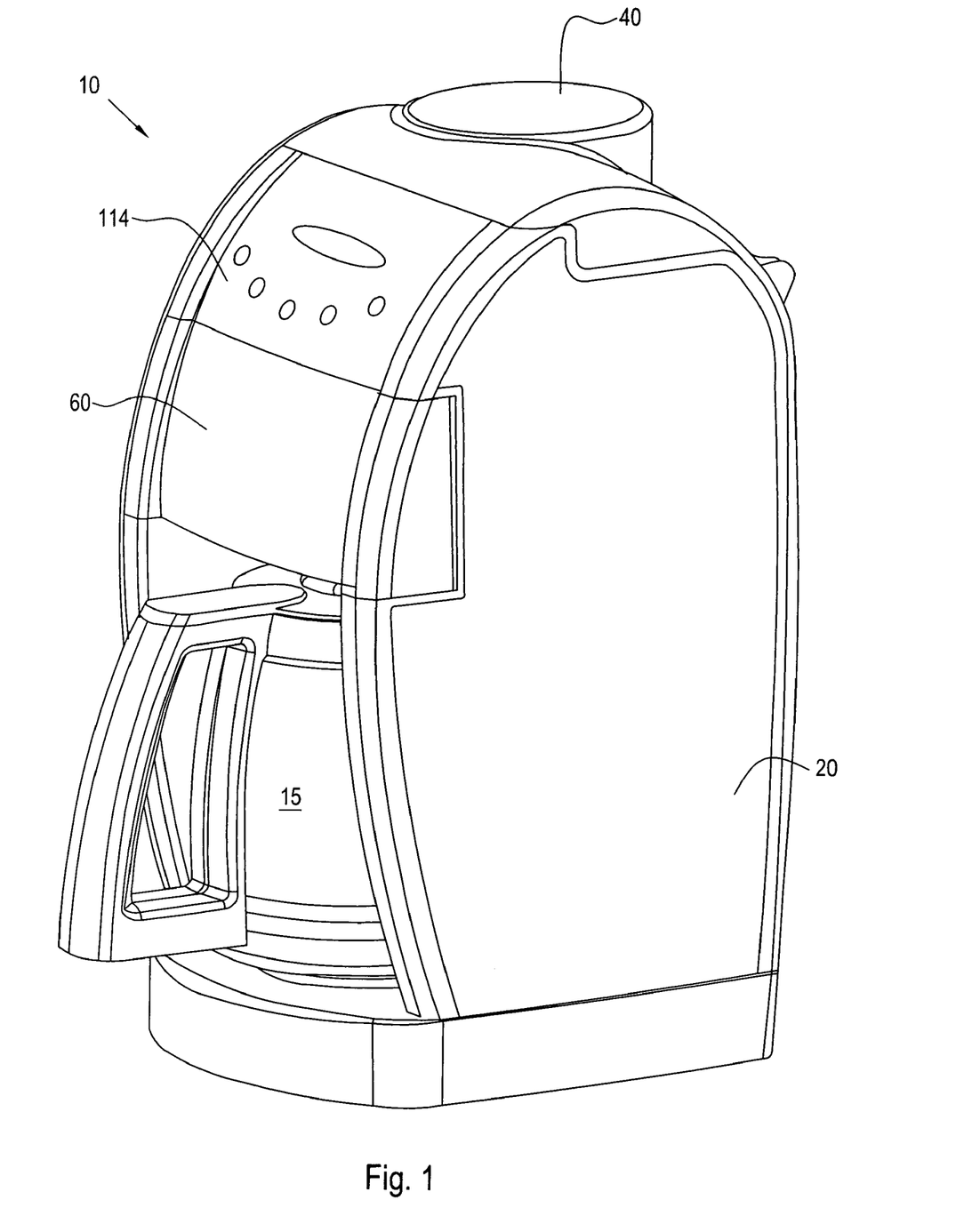
FIG. 1 is a perspective view of a coffee making apparatus in accordance with an illustrative embodiment of the present invention.
Figure 2:
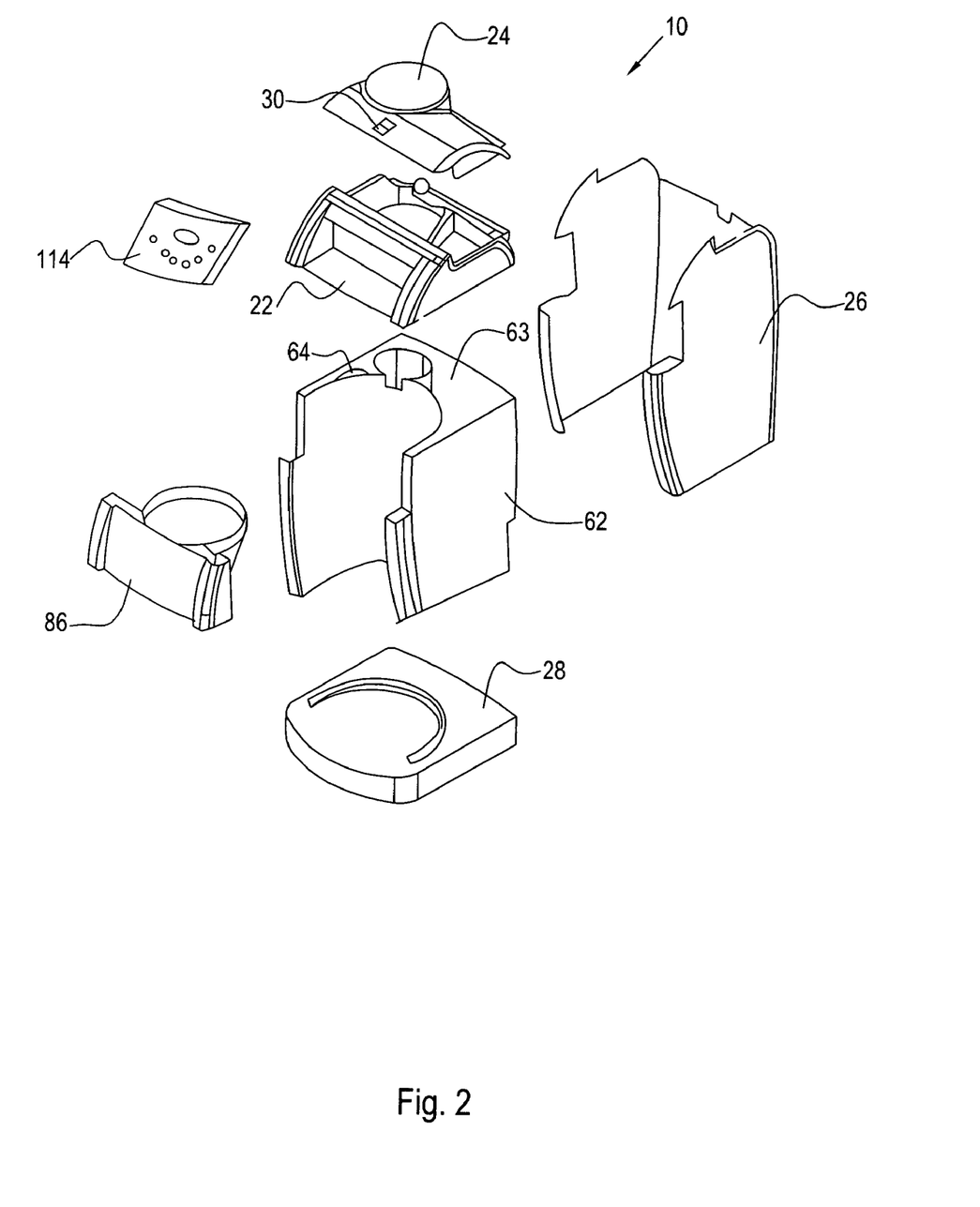
FIG. 2 is an exploded view of a housing assembly in accordance with the illustrative embodiment of the coffee making apparatus of FIG. 1.

Referring more particularly to FIG. 2, housing assembly 20 preferably has an upper casing 22 with a selectively removable or separable top cover 24, an outer enclosure 26, and a lower support base 28. Preferably, top cover 24 is pivotally connected to upper casing 22 via a hinge 21 to selectively open and close, and thereby provide access to various internal components of the coffee making apparatus. Top cover 24 can also have a transparent viewing portion 23 for allowing a user to view into the coffee making apparatus as well as the grinding chamber.

Figure 6:
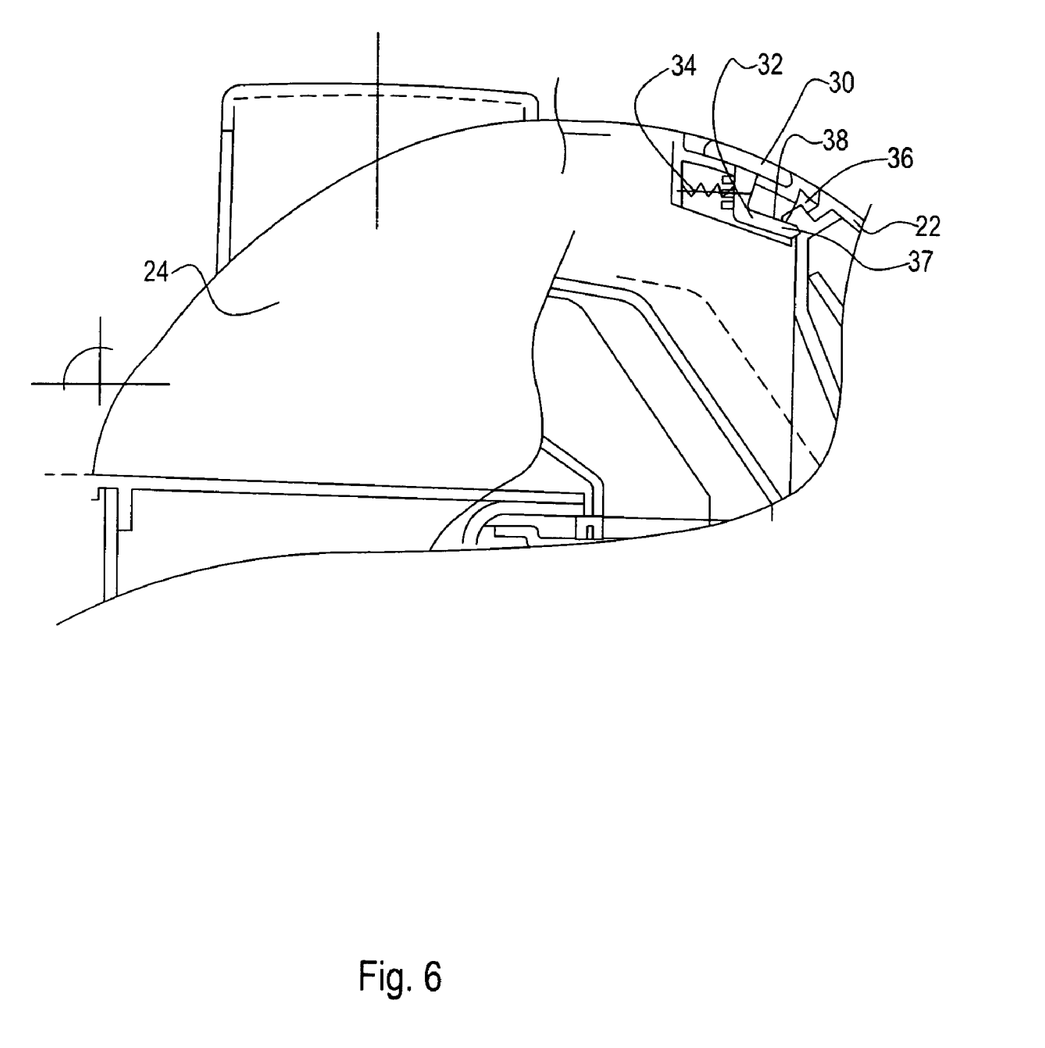
FIG. 6 is an upper side sectional view of the coffee making apparatus of FIG. 1.
Figures 7, 8:
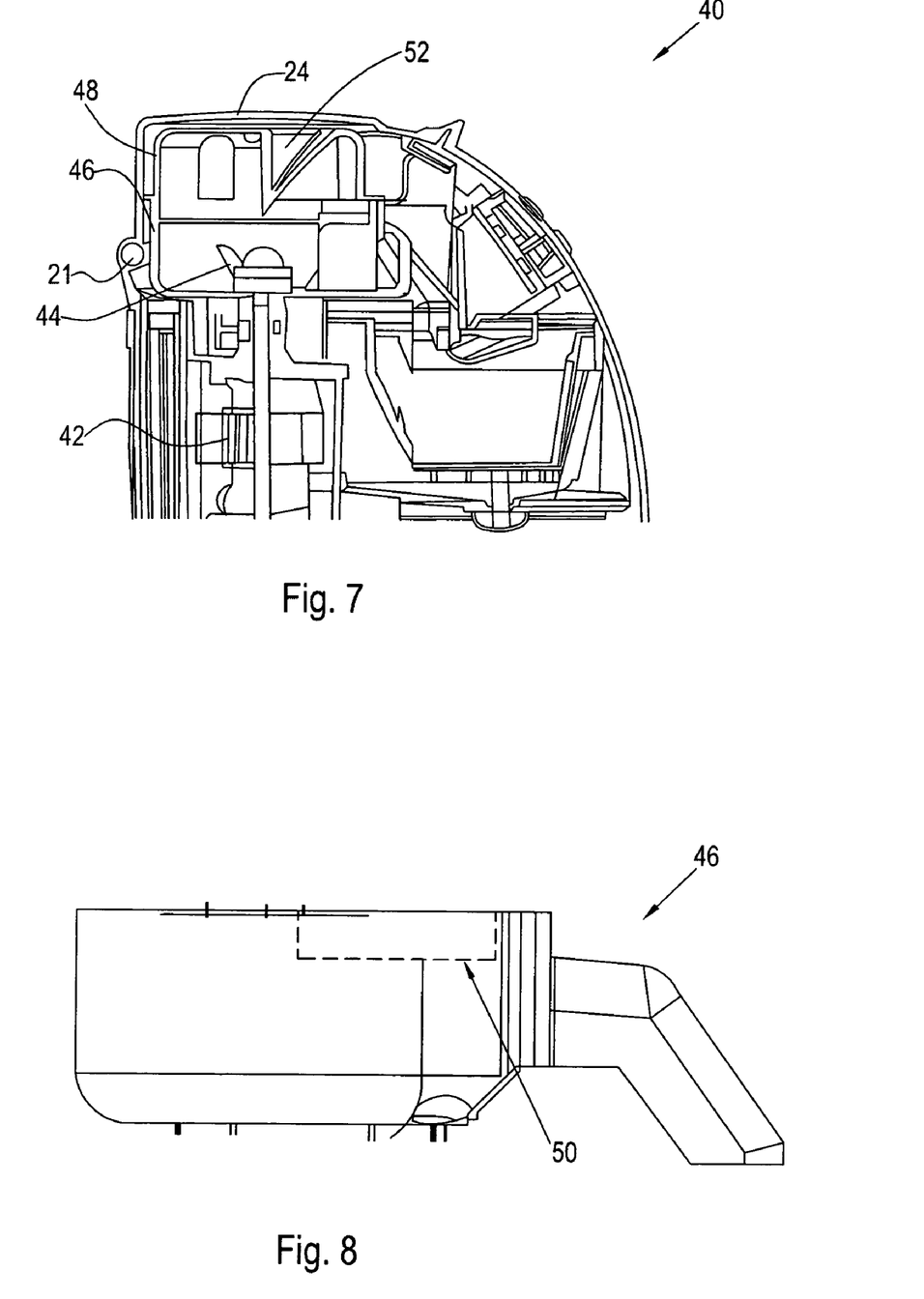
FIG. 7 is a side sectional view of the grinding assembly of FIG. 3.
FIG. 8 is an enlarged side view of a grinding chamber in accordance with the illustrative embodiment of the grinding assembly of FIG. 3.

Referring to FIG. 6, top cover 24 preferably also has a lock actuator 30 for cooperating with upper casing 22 to selectively lock the top cover in a closed position. Preferably, lock actuator 30 is mounted to top cover 24 and has a plunger 32 and a spring 34. When in the closed position, spring 34 holds actuator 30 such that plunger 32 is in engagement with a lock stop 36 attached to upper casing 22. When in an open position, actuator 30 is biased away from lock stop 36 such that plunger 32 is clear thereof and top cover 24 is allowed to pivotally open and/or be separated from upper casing 22. When actuator 30 is released, spring 34 biases plunger 32 to an extended position. When top cover 24 is subsequently closed, a beveled edge 37 of plunger 32 slides along a lip 38 of lock stop 36 causing spring 34 to be compressed such that plunger 32 is biased away from the lock stop and when the beveled edge of the plunger clears the lip of the lock stop, the spring biases the plunger to its original locked position.

Referring again to FIG. 2, outer enclosure 26 is preferably a single piece of heat resistant material that provides support to upper casing 22 and provides an insulating layer for grinding assembly 40 and brewing assembly 60. This insulating layer preferably dampens operative noise and provides better thermal efficiency. Lower support base 28 is preferably also formed of a heat resistant material and can be configured to support outer enclosure 26 as well as to selectively retain a carafe.

Referring to FIGS. 3, 4, 7 and 8, grinding assembly 40 has a motor 42, at least one grinding blade 44 operatively connected to the motor, a removable grinding chamber 46 with a removable grinding chamber cover 48 and a grate 49 for sieving coffee grinds.

Motor 42 is preferably of any type suitable for providing sufficient rotational speed or torque to grinding blade 44 to process or grind whole coffee beans into coffee grinds. Grinding blade 44, preferably, is mounted so as to rotate about a vertical axis. However, grinding blade 44 can also be disposed to operatively rotate about any other axis, such as a horizontal axis, suitable for effective/efficient operation in the coffee making apparatus.

Grinding chamber 46 is preferably made of a resilient material and is removable for easy cleaning. Further, grinding chamber 46 can have a fill-level indicator 50 for providing observable information relating to fill capacity. Grinding chamber cover 48 operates to prevent particles from being extruded from the grinding chamber during a grinding operation. Grinding chamber cover can also be fixed to the grinding chamber and have an inlet for receiving coffee beans into the grinding chamber.

Grinding chamber cover 48 is also selectively separable from grinding chamber 46 for more effective and efficient cleaning. Grate 49 preferably acts as a pass-through to brewing assembly 60 for grinds once they reach a desired size. Grate 49 preferably has a plurality or number of differently sized apertures 54 to facilitate the delivery of a mix of grind sizes. This can help reduce clumping and to enhance the aroma and flavor of the coffee.

Referring to FIGS. 2, 3, 5, 9 through 15, brewing assembly 60 has a fluid reservoir 62, a removable fluid filter assembly 65, and a brew basket assembly 80. Preferably, brewing assembly 60 cooperates with a heater (not shown) to provide heat as required for effective brewing. The heater can be of any known type sufficient for use with coffee makers.

Figure 18:
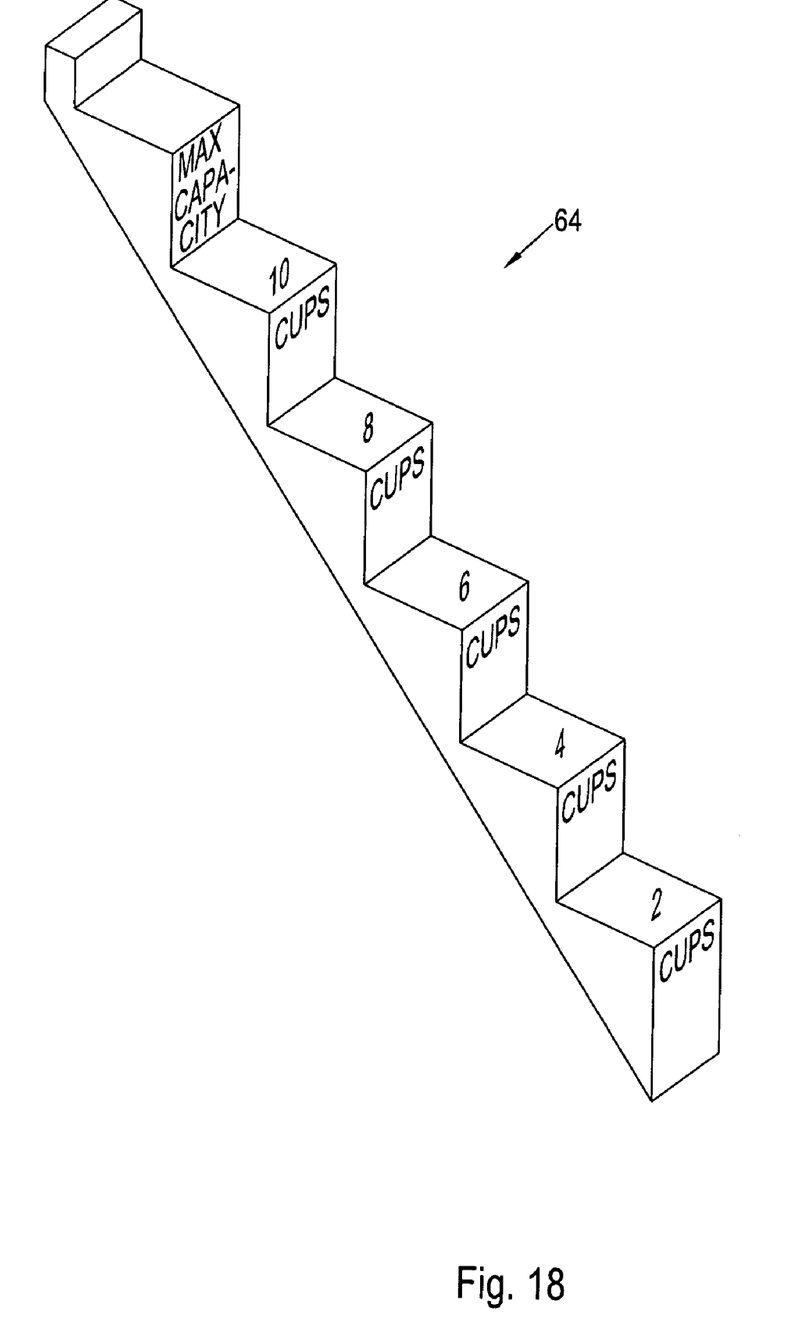
FIG. 18 is a perspective view of a fluid fill level indicator in accordance with the illustrative embodiment of the coffee making apparatus of FIG. 1.

Referring to FIG. 2, fluid reservoir 62 preferably has a relatively large upper fill area 63 for efficient filling and easy cleaning. Fluid reservoir 62 preferably also has a fluid level indicator 64 for providing observable information relating to fill level. Fluid level indicator 64 preferably has a stepped construction as shown in FIG. 18, but can also have a variety of other forms.

Figures 9, 10, 11:
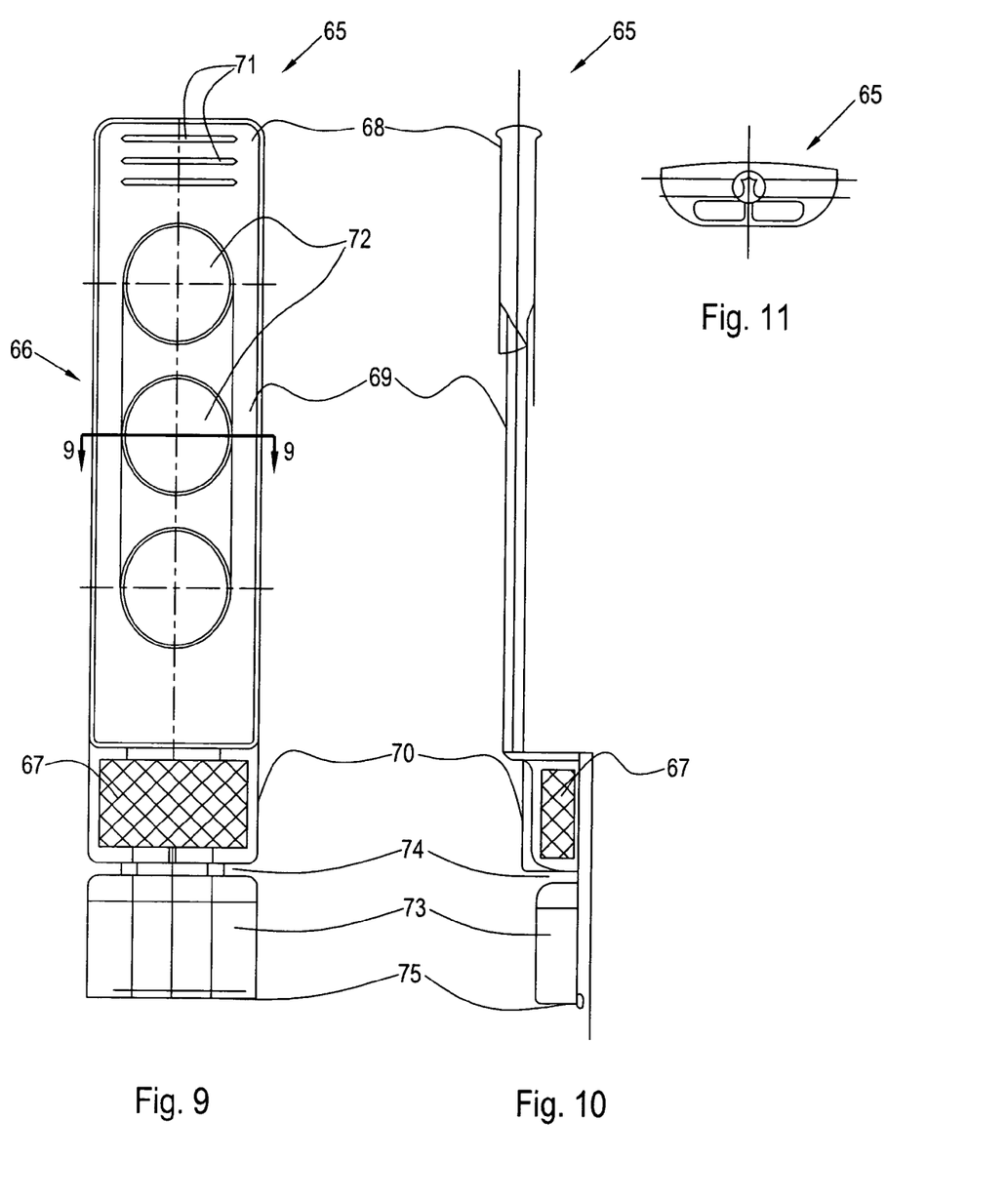
FIG. 9 is a first side view of a filter holder in accordance with the illustrative embodiment of the coffee making apparatus of FIG. 1.
FIG. 10 is a second side view, rotated ninety degrees from the first side view, of the filter holder of FIG. 7.
FIG. 11 is an end view of the filter holder of FIG. 7.

Referring to FIGS. 9 through 11, filter assembly 65, which is preferably situated in fluid reservoir 62 so as to allow fluid to circulate therethrough without impeding the brewing process, preferably, has a filter holder 66 and a replaceable filter 67. In addition, filter assembly 65 may optionally have a filter life indicator (not shown) for providing a visual indication of the need to replace the filter. Filter holder 66 has a handle 68, a stem 69, and a filter compartment 70 for selectively retaining filter 67. Handle 68 preferably has one or more gripping structures 71 to facilitate the grasping and/or handling of the filter holder. Stem 69 preferably has one or more apertures 72 disposed therein to make efficient use of fluid space in fluid reservoir 62. Filter compartment 70 preferably has an door or entrance 73 pivotally connected to filter compartment 70 by a hinge 74. Entrance 73 allows selective access to filter 67. Also, entrance 73 can preferably be locked closed by one or more snaps 75 to securely retain filter 67. It is noted that filter types suitable for removing lime, bad tastes, odors and scale may also be used. Filter 67 will preferably not release any properties into the fluid and is compact so as to not take up fluid reservoir space.

Figure 3:
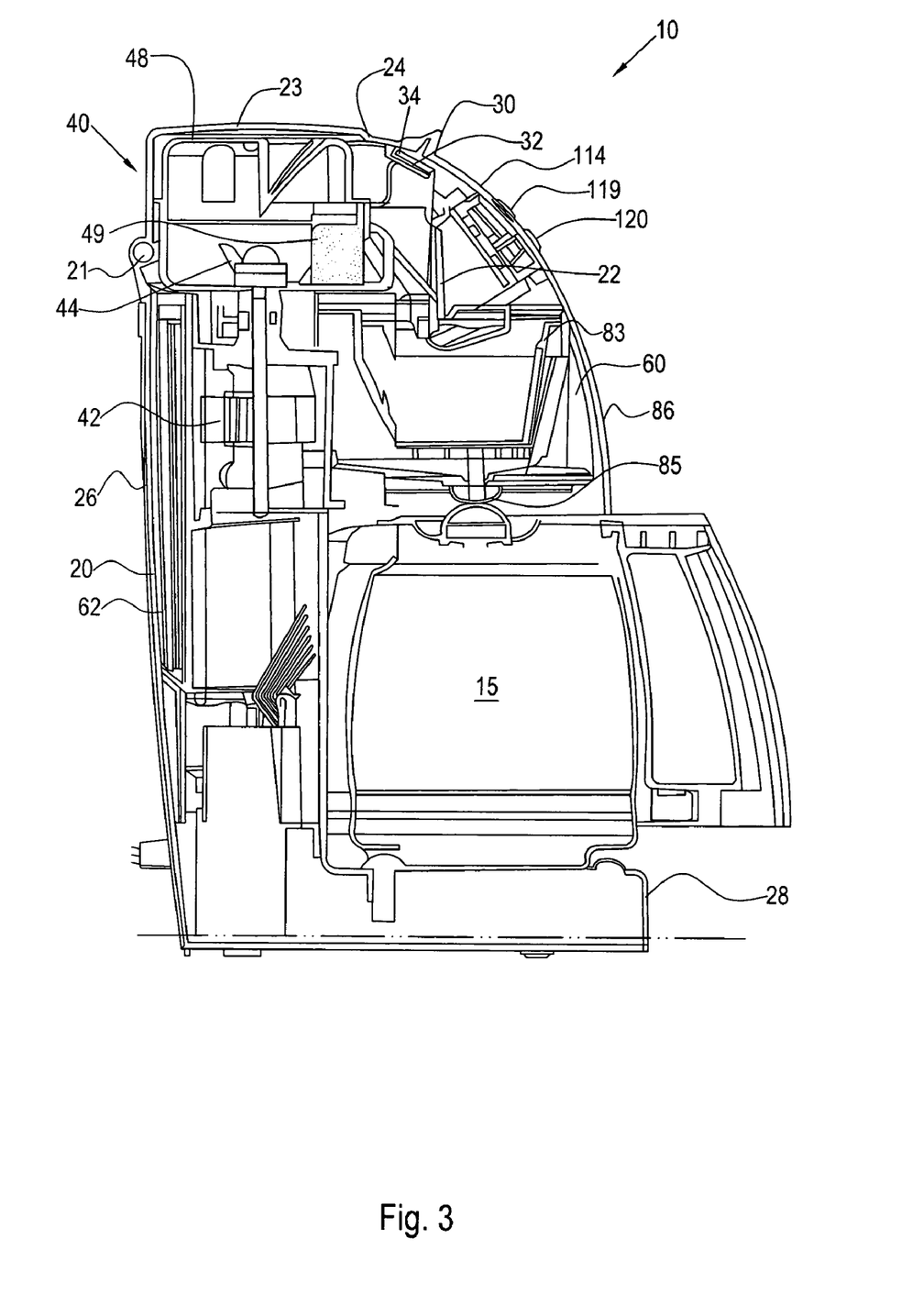
FIG. 3 is a sides section view of the coffee making apparatus of FIG. 1.
Figure 4:
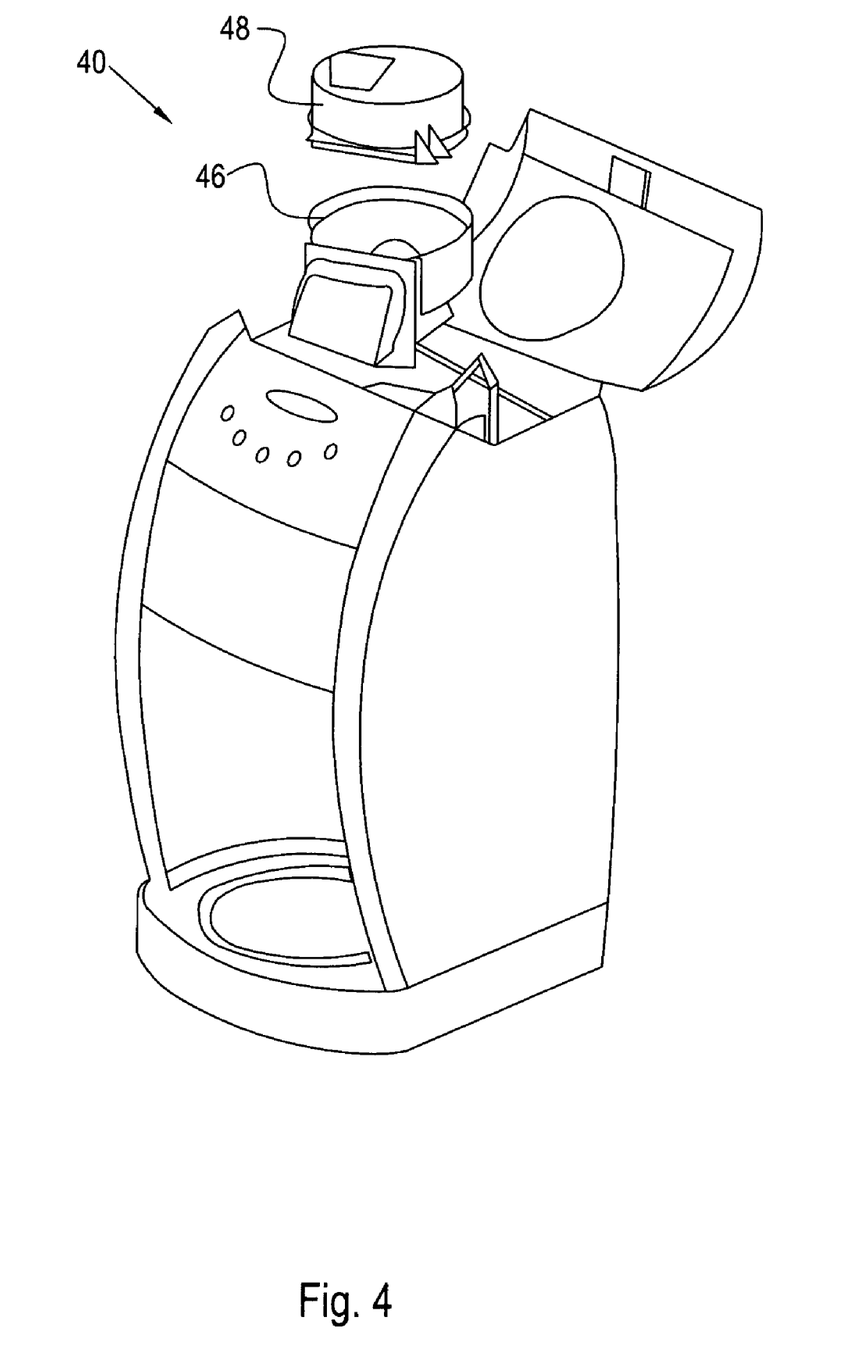
FIG. 4 is an exploded view of a grinding assembly in accordance with the illustrative embodiment of the coffee maker of FIG. 1.
Figure 5:
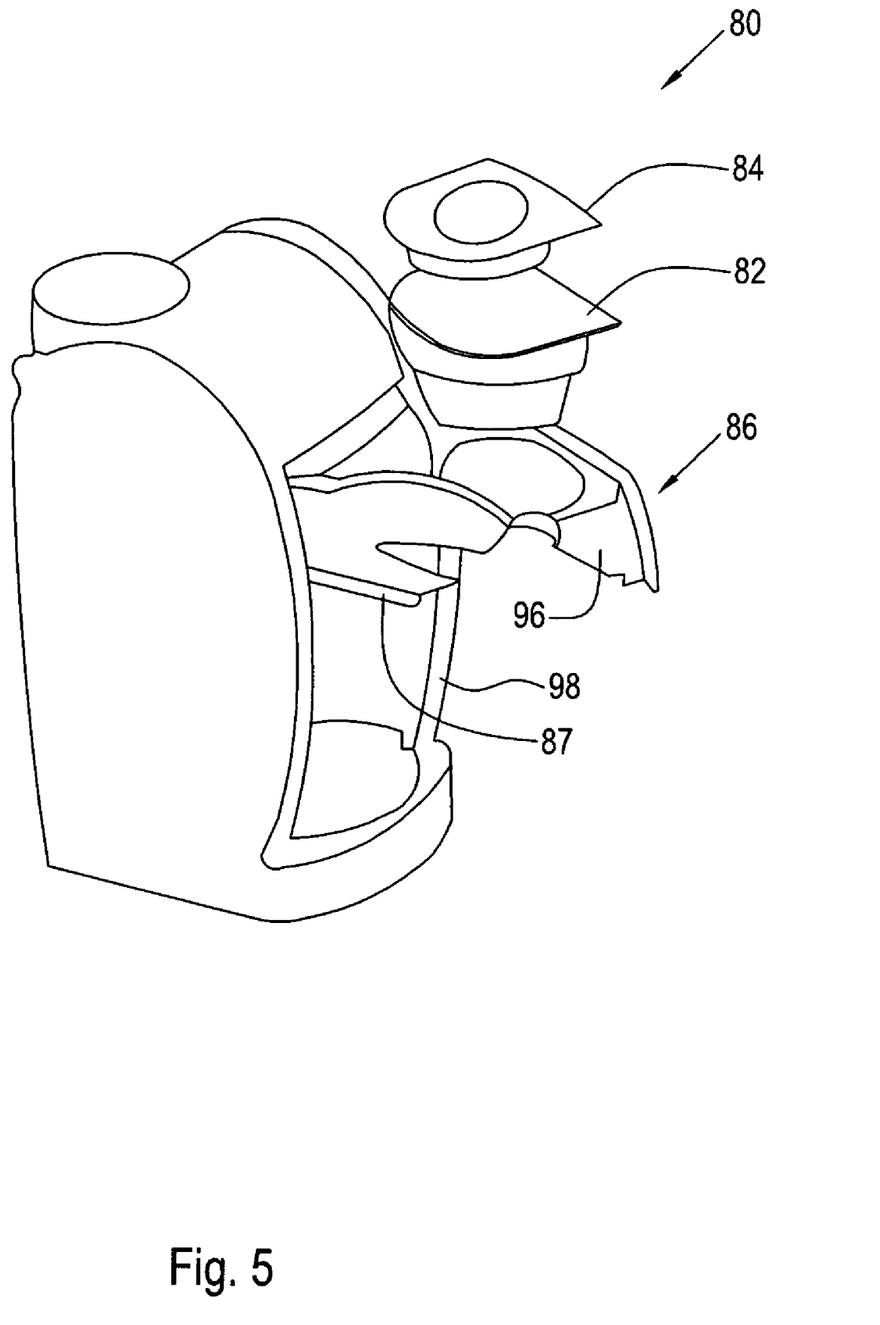
FIG. 5 is an exploded view of a brewing assembly in accordance with the illustrative embodiment of the coffee making apparatus of FIG. 1.

Referring to FIGS. 3 and 4, brew basket assembly 80 has a brew basket 82, a separable brew basket cover 84, and an access door assembly 86. Brew basket 82 selectively retains a replaceable brew filter 83 such as, for example, a cupcake paper filter or a cupcake gold tone filter having a stainless steel mesh. Brew basket 82 also has a poppit valve 85 for facilitating the transfer of brewed coffee into a carafe 15, shown in FIG. 1. The poppit valve preferably controls the flow of coffee into carafe 15 such that when the carafe is removed or displaced coffee stops flowing for a predetermined period of time or until the carafe is returned to its original position. Brew basket 82 preferably has a one-piece construction that is intuitive in use, is easily removed and/or replaced, and can be snap locked into position.

Figure 14:
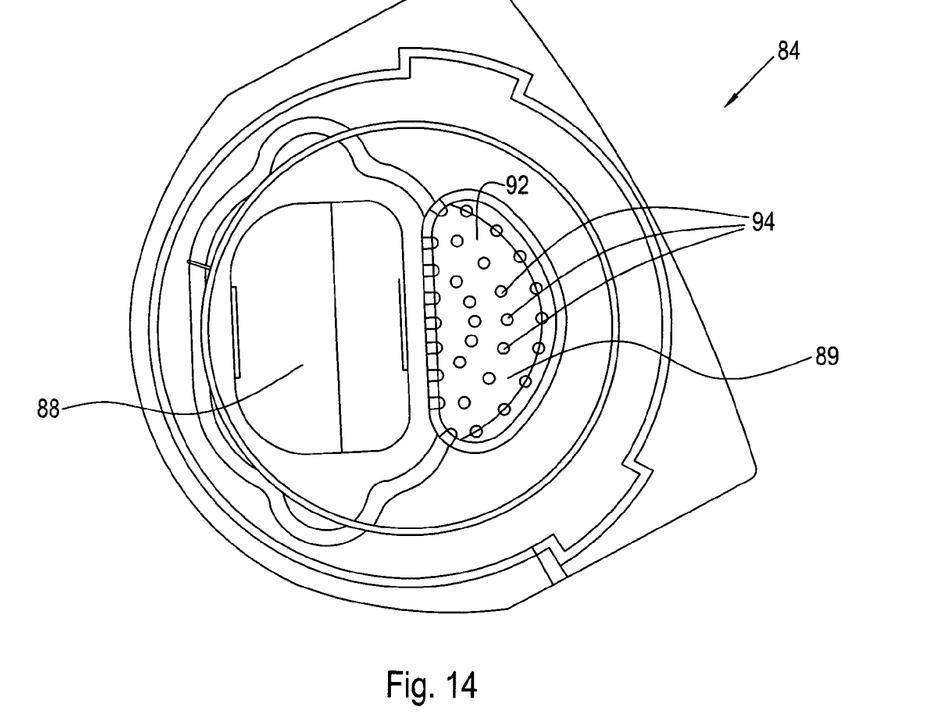
FIG. 14 is a top view of a brew basket cover in accordance with the illustrative embodiment of the coffee making apparatus of FIG. 1.
Figure 15:
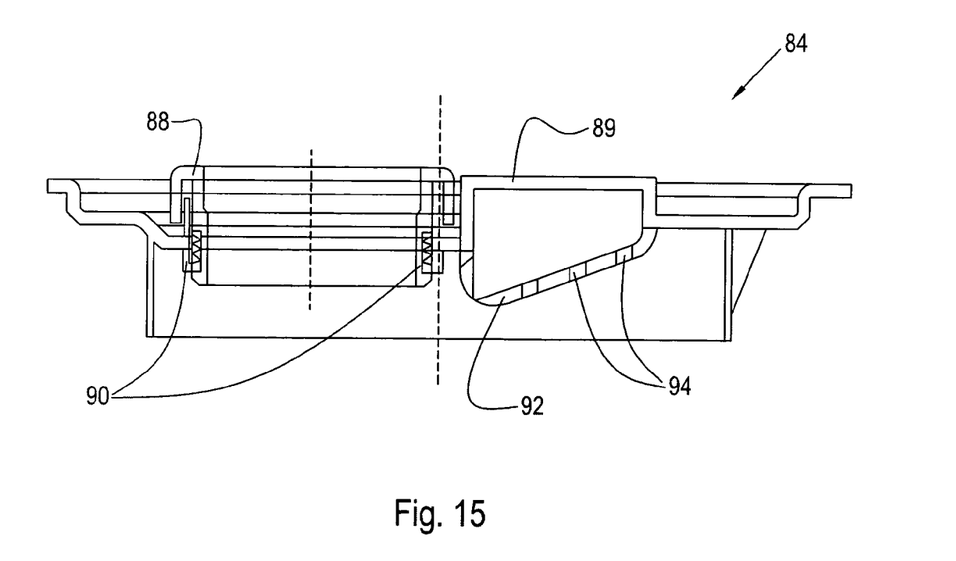
FIG. 15 is a side sectional view of the brew basket cover of FIG. 12.
Figure 16:
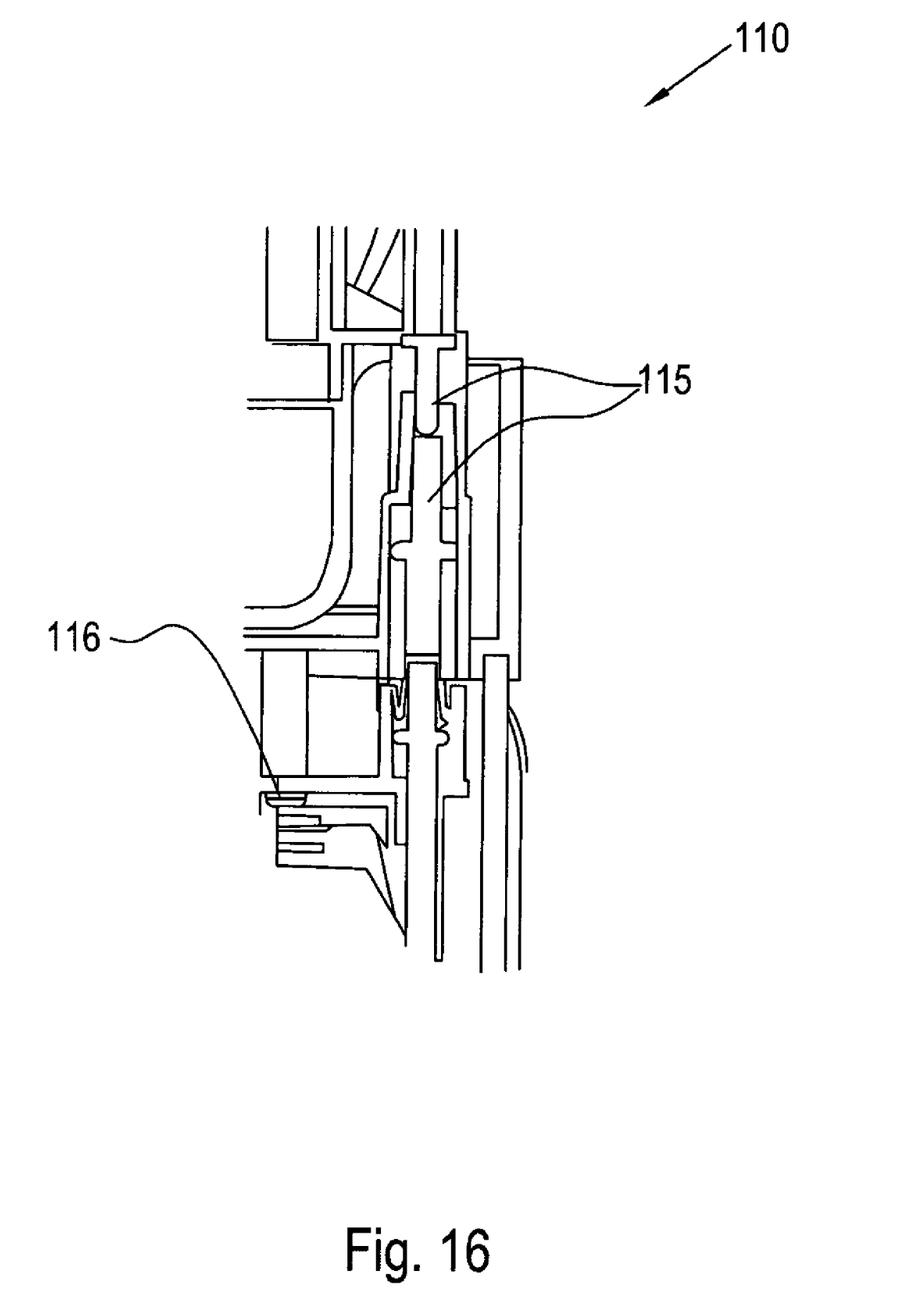
FIG. 16 is a side sectional view of a lock mechanism in accordance with the illustrative embodiment of the coffee making apparatus of FIG. 1.

Referring to FIGS. 14 and 15, brew basket cover 84 preferably has at least one grind inlet 88 and at least one spreader 89. Preferably, grind inlet 88 is mounted on one or more springs 90 that, when brew basket cover 84 is installed, grind inlet 88 cooperates with grinding chamber 46 to assure that the coffee grinds are substantially confined to the passage from the grind chamber through the grind inlet to the brew basket. Spreader 89 preferably has a basin 92 for receiving a fluid. Basin 92 preferably has an array of apertures 94 for distributing the fluid, which is preferably heated, over a wide surface area of the coffee grinds in brew basket 82.

Figure 12:
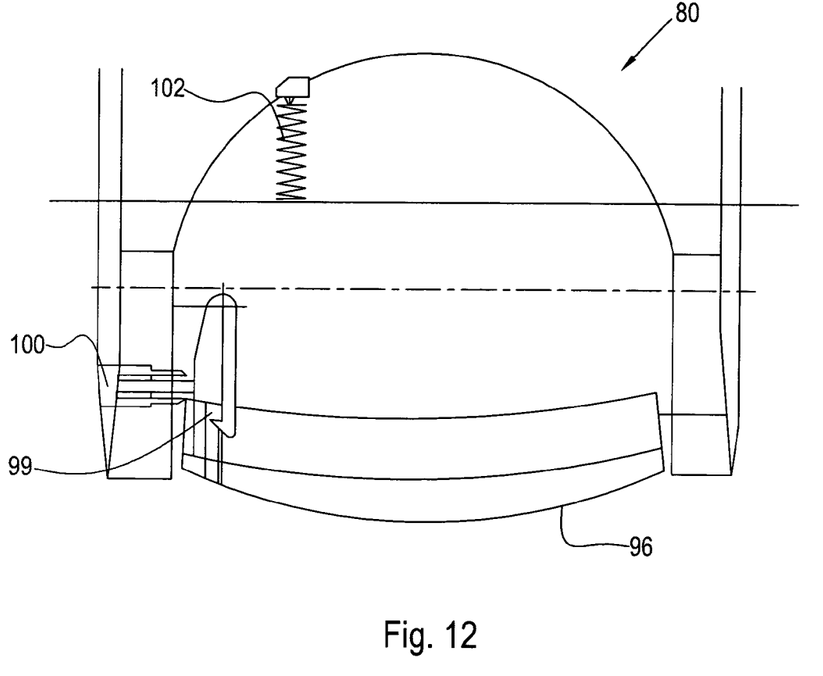
FIG. 12 is a top sectional view of the coffee making apparatus of FIG. 1, showing illustrative components of the brewing assembly of FIG. 4.
Figure 13:
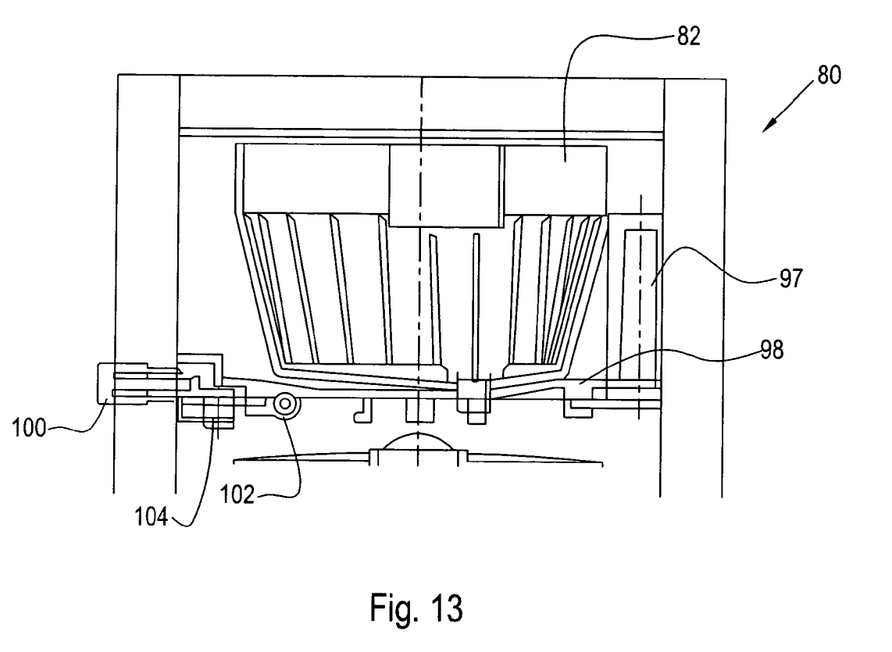
FIG. 13 is a side sectional view of the brewing assembly of FIG. 4.

Referring to FIGS. 3, 4, 12 and 13, door assembly 86 preferably has a door 96 and hinge 97, a plate 98 supported by one or more rails 87 so as to cooperate with door 96, a latch 99, and an actuator 100. In addition, door assembly 86 can also have a return spring 102 and a torsion spring 104. Preferably, door 96 and plate 98 are connected to support brew basket 82, enable a user to selectively access and/or remove brew basket 82. Preferably, door 96 is held in a closed position by latch 99. If return spring 102 and torsion spring 104 are used, the return spring is positioned, as shown in FIG. 12, so as to be in compression when door 96 is in a closed position. When actuator 100 is operated, latch 99 is released and door 96 opens via return spring 102 decompressing to bias plate 98 outwardly a short distance. Door 96 can then be fully opened manually by rotation about hinge 97 to allow removal of the brew basket for cleaning, replacement, manually filling with grinds and the like. When actuator 100 is released, torsion spring 104 returns latch 99 to its original position and the door can be manually closed and the latch reengaged. It is noted that the use of return spring 102 and/or torsion spring 104 is optional and that the door assembly can be entirely manually opened and closed.

Referring to FIGS. 2, 3, 17, and 18, control assembly 110 preferably has a safety lock mechanism 112 and a control panel 114 to provide the user with control of a variety of different operative features. Lock mechanism 112 preferably prevents the coffee making apparatus from operating unless top cover 24 and grinding chamber cover 48 are each in a proper operating position. Preferably, lock mechanism 112 has one or more switches 116 that cooperate with top cover 24 and grinding chamber cover 48, via one or more actuators 115, to detect the motion thereof. Accordingly, if one or more of said covers are opened and/or displaced the coffee making apparatus takes one or more safety steps. The one or more safety steps can include, for example, providing an audible warning signal, providing a visible warning signal, terminating the grind and/or brew cycle, terminating the operation of the coffee making apparatus completely, or any combinations thereof. The one or more safety steps can preferably be overridden by properly positioning and/or closing the appropriate cover or covers and restarting the operation via control panel 114.

Figure 17:
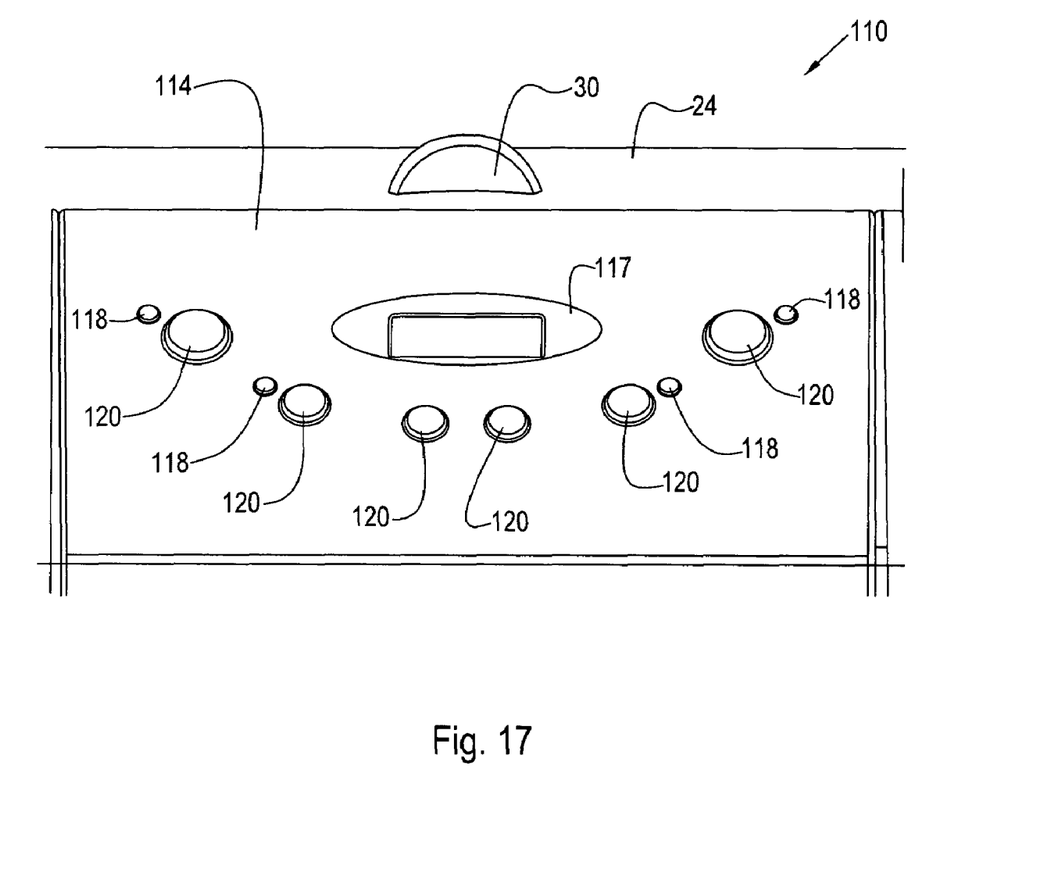
FIG. 17 is an enlarged plan view of a control panel in accordance with the illustrative embodiment of the coffee making apparatus of FIG. 1.

Referring to FIGS. 3 and 17, control panel 114 preferably has a number of indicators 118 including for example, an "on" indicator, an "auto on" indicator, a "grind off" indicator, a "1–4 cup" or a small batch brew indicator, and a liquid crystal display (LCD). Control panel 114 preferably also has a number of control buttons 120, such as for example, hour and minute buttons for a programmable real time clock, a "grind off" button, a "1–4 cup" button, an "on/off" button, and a programmable "auto on" button. Preferably, control buttons 120 cooperate with indicators 118 and a microprocessor to control the coffee making apparatus in accordance with the users desire. Other features optionally controlled via the microprocessor and control panel 114 might include a power loss back-up feature, and/or an audible ready indicator feature. Control panel 114 preferably also has an LCD display feature 119.

The present invention having been thus described with particular reference to the preferred forms thereof, it will be obvious that various changes and modifications may be made therein without departing from the spirit and scope of the present invention as defined herein.

What is claimed is:

1. A coffee making apparatus for selectively grinding and brewing coffee comprising:
   a housing assembly;
   a grinding assembly for grinding coffee beans;
   a brewing assembly for brewing coffee grinds; and
   a control assembly for controlling the operation of the coffee making apparatus,
   wherein said grinding assembly has a motor, at least one grinding blade operatively connected to said motor, a removable grinding chamber having a separable cover and a grate for sieving coffee grinds, wherein said grate has a plurality of differently sized apertures to deliver a mix of grind sizes.

2. A coffee making apparatus for selectively grinding and brewing coffee comprising:
   a housing assembly;
   a grinding assembly for selectively grinding coffee beans;
   a brewing assembly for brewing coffee grinds; and
   a control assembly for controlling the operation of the coffee making apparatus,
   wherein said brewing assembly has a fluid reservoir, a removable fluid filter assembly, and a brew basket assembly, wherein said removable filter assembly has a filter and a filter holder, wherein said filter holder has a handle, a stem, and a filter compartment for selectively retaining said filter, wherein said stem has one or more apertures disposed therein for efficient use of fluid reservoir space and manufacturing materials.

3. A coffee making apparatus for selectively grinding and brewing coffee comprising:
   a housing assembly;
   a grinding assembly for selectively grinding coffee beans;
   a brewing assembly for brewing coffee grinds; and
   a control assembly for controlling the operation of the coffee making apparatus,
   wherein said brewing assembly has a fluid reservoir, a removable fluid filter assembly, and a brew basket assembly, wherein said removable filter assembly has a filter and a filter holder, wherein said filter holder has a handle, a stem, and a filter compartment for selectively retaining said filter, wherein said filter compartment has an entrance for allowing a user access to said filter, wherein said entrance is a door pivotally connected to said filter compartment via a hinge.

4. The coffee making apparatus of claim 3, wherein said door can be locked closed to securely retain said filter.

5. The coffee making apparatus of claim 4, wherein said door is closed via one or more snaps.

6. A coffee making apparatus for selectively grinding and brewing coffee comprising:
   a housing assembly;
   a grinding assembly for selectively grinding coffee beans;
   a brewing assembly for brewing coffee grinds; and
   a control assembly for controlling the operation of the coffee making apparatus,
   wherein said brewing assembly has a fluid reservoir, a removable fluid filter assembly, and a brew basket assembly, wherein said removable filter assembly has a filter and a filter holder, wherein said filter holder has a handle, a stem, and a filter compartment for selectively retaining said filter, wherein said removable fluid filter assembly further comprises a filter life indicator.

7. A coffee making apparatus for selectively grinding and brewing coffee comprising:
   a housing assembly;
   a grinding assembly for selectively grinding coffee beans;
   a brewing assembly for brewing coffee grinds; and
   a control assembly for controlling the operation of the coffee making apparatus, wherein said brewing assembly has a fluid reservoir, a removable fluid filter assembly, and a brew basket assembly, wherein said brew basket assembly has a removable brew basket with a separable cover and an access door assembly, wherein said brew basket cover has an inlet for receiving coffee grinds and a spreader for receiving and distributing a fluid over said coffee grinds.

8. The coffee making apparatus of claim 7, wherein said fluid is heated.

9. A coffee making apparatus for selectively grinding and brewing coffee comprising:
- a housing assembly;
- a grinding assembly for selectively grinding coffee beans;
- a brewing assembly for brewing coffee grinds; and
- a control assembly for controlling the operation of the coffee making apparatus,
- wherein said brewing assembly has a fluid reservoir, a removable fluid filter assembly, and a brew basket assembly, wherein said brew basket assembly has a removable brew basket with a separable cover and an access door assembly, wherein said access door assembly has a door and hinge, a plate, a latch, and an actuator.

10. The coffee making apparatus of claim 9, wherein said brew basket is disposed on said plate.

11. The coffee making apparatus of claim 10, wherein said plate is connected to said door.

12. The coffee making apparatus of claim 11, wherein said latch holds said door in a closed position.

13. The coffee making apparatus of claim 12, wherein said actuator selectively releases said latch to allow said door to be manually opened by rotation about said hinge to provide access to said brew basket.

14. The coffee making apparatus of claim 12, wherein said access door assembly further has one or more springs for providing a force to automatically open said door upon the release of said latch via said actuator.

15. A coffee making apparatus for selectively grinding and brewing coffee comprising:
- a housing assembly having an upper separable cover;
- a grinding assembly having a grinding chamber with a separable cover;
- a brewing assembly having a brew basket with a separable cover; and
- a control assembly for controlling the operation of the coffee making apparatus,
- wherein said control assembly has an safety lock mechanism and a control panel to provide a user with different operative features, wherein said safety lock mechanism has a number of lock switches for cooperating with said top cover and said grinding chamber cover to detect the motion thereof such that if said top cover and/or said grinding chamber cover is open and/or displaced the coffee making apparatus takes one or more safety steps.

16. The coffee making apparatus of claim 15, wherein said one or more safety steps can include providing an audible warning signal, providing a visible warning signal, terminating the grind and/or brew cycle, and/or terminating the operation of the coffee making apparatus completely.

17. The coffee making apparatus of claim 16, wherein said one or more safety steps can be overridden by closing and/or properly positioning said top cover and/or said grinding chamber cover and restarting the operation.

\* \* \* \* \*